(12) United States Patent
Leck et al.

(10) Patent No.: US 10,920,654 B2
(45) Date of Patent: Feb. 16, 2021

(54) CONNECTOR

(71) Applicant: Ford Global Technologies, LLC, Dearborn, MI (US)

(72) Inventors: Chris Leck, Enfield (GB); Duncan Scholtes, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/264,524

(22) Filed: Jan. 31, 2019

(65) Prior Publication Data
US 2019/0242292 A1 Aug. 8, 2019

(30) Foreign Application Priority Data
Feb. 2, 2018 (GB) ..................... 1801758

(51) Int. Cl.
| | | |
|---|---|---|
| *F01P 7/16* | (2006.01) | |
| *F01P 7/12* | (2006.01) | |
| *F16K 17/02* | (2006.01) | |
| *F16K 31/00* | (2006.01) | |
| *F01P 7/14* | (2006.01) | |
| *F01P 7/02* | (2006.01) | |
| *F01P 11/02* | (2006.01) | |
| *F01P 3/22* | (2006.01) | |

(52) U.S. Cl.
CPC .............. *F01P 7/165* (2013.01); *F01P 7/16* (2013.01); *F16K 17/02* (2013.01); *F16K 31/002* (2013.01); *F01P 7/026* (2013.01); *F01P 7/12* (2013.01); *F01P 11/0295* (2013.01); *F01P 2003/2214* (2013.01); *F01P 2007/146* (2013.01); *F01P 2025/50* (2013.01); *F01P 2060/04* (2013.01); *F01P 2060/08* (2013.01); *F01P 2060/14* (2013.01)

(58) Field of Classification Search
CPC ........ F01P 7/165; F01P 7/16; F01P 2007/146; F01P 2025/50; F01P 11/0295; F01P 2003/2214; F01P 2060/14; F01P 7/026; F01P 7/12; F16K 17/02; F16K 31/002
See application file for complete search history.

(56) References Cited

U.S. PATENT DOCUMENTS 3,246,637 A * 4/1966 Walsh .................... F01P 11/028
123/41.1
5,048,751 A   9/1991 DuBois
(Continued)

FOREIGN PATENT DOCUMENTS

JP   S57131818 A   8/1982

OTHER PUBLICATIONS

Great Britain Intellectual Property Office, Combined Search and Examination Report under Sections 17 and 18(3) Issued in Application No. GB1801758.2, dated Jul. 24, 2018, 5 pages.

*Primary Examiner* — Syed O Hasan
(74) *Attorney, Agent, or Firm* — Geoffrey Brumbaugh McCoy Russell LLP (57) ABSTRACT

A connector for an engine cooling system is provided. The connector may be located in a chamber with two inlets and an outlet. The connector may include a thermostatic valve. A temperature sensitive element may move the thermostatic valve between an open and closed position. A pressure relief valve may also be incorporated into the thermostatic valve. An engine cooling system comprising the connector is also provided.

17 Claims, 4 Drawing Sheets

(56) References Cited

U.S. PATENT DOCUMENTS

| | | | | |
|---|---|---|---|---|
| 5,979,778 A | * | 11/1999 | Saur | F01P 7/16 236/34.5 |
| 9,695,735 B2 | * | 7/2017 | Auweder | F01P 7/16 |
| 2009/0145374 A1 | * | 6/2009 | Hutchins | F01P 7/16 123/41.1 |
| 2009/0205589 A1 | * | 8/2009 | Auweder | F01P 7/161 123/41.09 |
| 2018/0297445 A1 | * | 10/2018 | Onishi | B60H 1/00921 |

* cited by examiner

CONNECTOR

CROSS REFERENCE TO RELATED APPLICATION

The present application claims priority to Great Britain patent application No. 1801758.2, filed on Feb. 2, 2018. The entire contents of the above-listed application are hereby incorporated by reference for all purposes.

TECHNICAL FIELD

The present disclosure relates to a connector for an engine cooling system and the connector improving engine warm-up.

BACKGROUND

Engine cooling systems, including engines of motor vehicles, typically comprise a coolant pump driven by the engine to pump coolant through a housing of the engine, in order to cool the engine. After passing through the engine housing, the coolant is typically directed to flow through a radiator of the cooling system, where heat is rejected from the coolant into a flow of air passing over the radiator.

When the engine is initially started, and is operating at a reduced temperature, one or more systems of the engine, such as the engine lubrication system, may not operate as effectively compared to when the engine is operating at a normal operating temperature. The efficiency of the engine may therefore be reduced.

It is therefore often desirable for the temperature of the engine to be allowed to increase quickly following a cold engine start, in order to reach a normal operating temperature in a shorter period of time. It may be desirable to reduce the amount of cooling provided by the engine cooling system during engine warm-up.

However, if a driver of the motor vehicle operates the engine by requesting a large power or torque whilst the engine is heating up, temperatures of one or more components of the engine may increase quickly whilst the engine is supplying the large power or torque. The temperatures of the one or more components may increase without the overall temperature of the engine being significantly increased.

A conflict therefore exists between controlling the engine cooling system to allow the engine to heat up quickly after a cold start, and providing sufficient cooling when the engine is operating to provide a high power or torque during engine warm-up.

STATEMENTS OF INVENTION

According to an aspect of the present disclosure, there is provided a connector for an engine cooling system, the connector comprising: a first inlet; a second inlet; an outlet; a chamber in fluidic communication with the first inlet, second inlet and the outlet; a thermostatic valve provided within the chamber, the thermostatic valve configured to selectively restrict flow from the first inlet to the outlet, wherein the thermostatic valve is arranged such that fluid from the second inlet passes through the chamber to the outlet and is in thermal communication with the thermostatic valve, such that the thermostatic valve opens or closes in response to a temperature of the fluid from the second inlet; and a pressure relief valve provided within the chamber and within a flow path from the first inlet to the outlet, the pressure relief valve opening in response to a pressure of fluid at the first inlet to bypass the thermostatic valve, and wherein the pressure relief valve is integrated into the thermostatic valve. Thus a flow path from the first inlet to the outlet is selectively restricted by the thermostatic valve. The valve opens to a flow to the outlet in response to temperature. Further, an independent pressure relief valve of the thermostatic valve opens in response to pressure The pressure relief valve may be integrated into the thermostatic valve. The pressure relief valve may be arranged to permit a flow of fluid from the first inlet through the thermostatic valve, in order to bypass the thermostatic valve, when the pressure relief valve is open.

The thermostatic valve and/or the chamber may form a weir to allow a bleed flow of fluid through or past the thermostatic valve, such as when the thermostatic valve is closed.

The thermostatic valve may comprise a valve element for selectively restricting the flow through the thermostatic valve. The valve element may be movable between open and closed positions of the thermostatic valve, such as when the thermostatic valve opens and closes. The thermostatic valve may comprise a biasing element for biasing the valve element into a closed position.

A bleed opening may be provided in the valve element to allow a bleed flow of fluid through the thermostatic valve, such as when the valve element is in the open and closed positions. The thermostatic valve may open or close at least partly in response to a temperature of fluid bleeding through the thermostatic valve.

The valve element may comprise a valve opening. The pressure relief valve may be configured to selectively restrict flow through the valve opening. For example, the pressure relief valve may comprise a further valve element configured to selectively block the valve opening. The valve element may be biased into a closed position of the pressure relieve valve, such as by a further biasing element.

When the pressure relief valve is closed, the pressure relief valve may restrict flow through the valve opening. When the pressure relief valve is open, the pressure relief valve may permit a flow through the valve opening.

The pressure relief valve may be configured to open in response to a difference in pressure between the fluid at the first inlet and the fluid at the second inlet. For example, if the pressure of fluid at the first inlet is greater than the pressure of fluid at the second inlet by a threshold value, the pressure relief valve may open.

The connector may be a T-connector.

An engine cooling system may comprise the above-mentioned connector.

The engine cooling system may comprise an engine thermostat for controlling a flow of coolant to a radiator of the cooling system, such as from an engine housing to the radiator, and a bypass passage of the cooling system, the bypass passage bypassing the radiator.

The connector may be provided in a duct downstream of the engine thermostat, such as directly downstream of the engine thermostat. The engine thermostat may be arranged between a pump of the engine cooling system and the connector, such as relative to a flow of coolant through the engine cooling system. The connector may be provided in the bypass passage of the engine cooling system.

The second inlet of the connector may be in fluid communication with an ancillary component of the engine cooling system. The connector may be arranged to receive a flow of fluid, such as coolant, from the ancillary component of the engine cooling system. The flow of fluid to the second inlet may not pass through the engine thermostat after passing through a coolant pump of the engine cooling system.

The second inlet of the connector may be in fluid communication with an oil cooler of the engine cooling system. Additionally or alternatively, the second inlet may be in fluid communication with a heater, such as a cabin air heater for a climate control system of the motor vehicle.

A vehicle, such as a motor vehicle may comprise the above mentioned connector or the above mentioned engine cooling system.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

For a better understanding of the present invention, and to show more clearly how it may be carried into effect, reference will now be made, by way of example, to the accompanying drawings.

DETAILED DESCRIPTION

Figure 1:
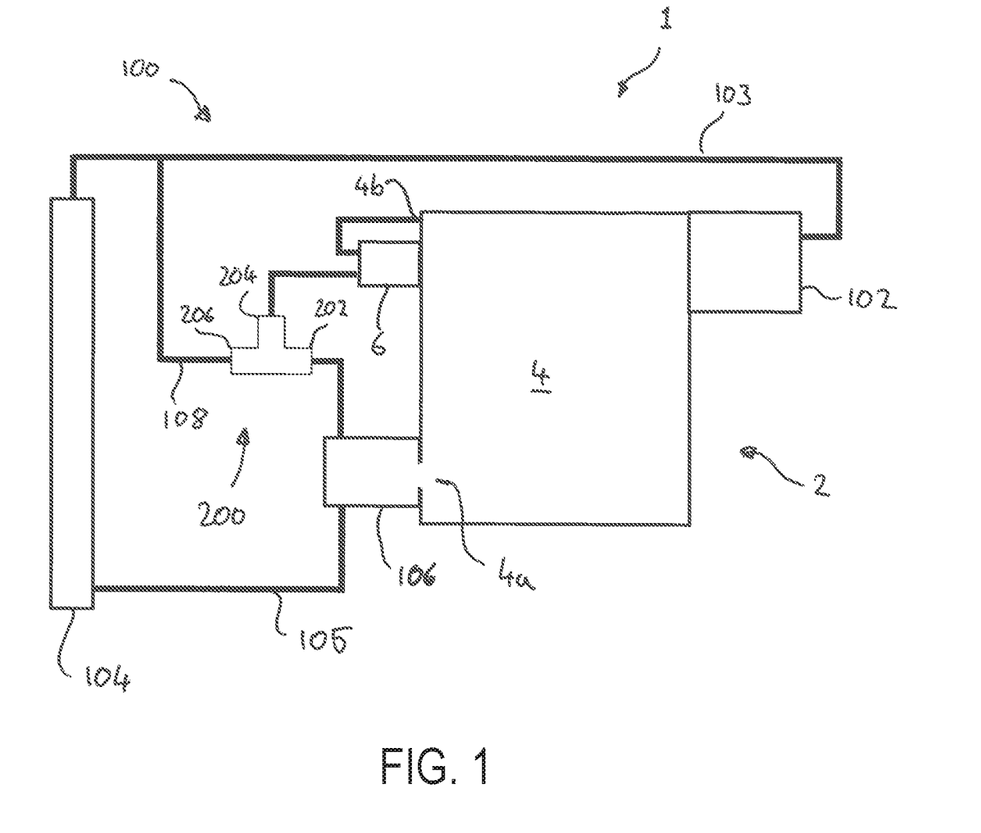
FIG. 1 is schematic view of an engine assembly comprising an engine cooling system according to arrangements of the present disclosure.

With reference to FIG. 1, an engine assembly 1, such as for a motor vehicle, comprises an engine 2, having one or more engine housings 4, such as a cylinder block and/or cylinder head, and an engine cooling system 100.

The engine cooling system 100 comprises a coolant pump 102 for pumping a flow of coolant around the cooling system 100. The coolant pump 102 may be driven, such as directly driven, by the engine 2. Alternatively, the coolant pump 102 may be electrically driven or driven by another engine or motor provided on the vehicle.

Coolant pumped by the cooling pump 102 may flow through the engine housing 4 in order to cool the engine 2. The coolant may leave the engine housing 4 via a first outlet 4a and flow towards a radiator 104 of the cooling system 100.

In the radiator 104, heat is rejected from the coolant into a flow of air passing over the radiator 104. The coolant leaving the radiator 104 may return to the coolant pump 102 via a return duct 103 to be recirculated around the cooling system 100.

When the engine 2 is initially started, the engine 2 may be at a lower temperature than a normal operating temperature of the engine. In such circumstances, it may be desirable to allow the engine to heat up to the normal operating temperature quickly. During engine warm-up, the cooling system 100 may be configured to operate such that the amount of cooling being provided by the cooling system to the engine, such as the amount of heat being removed from the engine housing 4 by the cooling system, is reduced.

The cooling system 100 may further comprise an engine thermostat 106. As depicted, the engine thermostat 106 may be provided on the engine 2, such as on the engine housing 4, and may control the flow of coolant leaving the engine housing 4 from the first outlet 4a.

When the temperature of the coolant leaving the engine housing 4 is at or above a first threshold temperature, such as when the engine 2 is operating at its normal operating temperature, the engine thermostat 106 may direct the flow of coolant leaving the engine housing 4 to flow through the radiator 104 via a radiator duct 105. The cooling system 100 thereby operates effectively to remove heat form the engine 2, as described above.

When the temperature of the coolant leaving the engine housing 4 via the first outlet 4a is below the first threshold temperature, or a second threshold temperature, such as during engine warm-up, the engine thermostat 106 may direct the flow of coolant leaving the engine housing into a bypass duct 108 arranged to bypass the radiator 104. Coolant passing through the bypass duct 108, may return to the coolant pump 102 without passing through the radiator 104. As depicted, the bypass duct 108 may carry the coolant from the engine thermostat 106 to the return duct 103.

When the radiator 104 is being bypassed, the coolant being pumped into the engine housing 4, may be at a higher temperature than it would have been if it had passed through the radiator 104. Hence, less heat may be removed from the engine 2 by the coolant. The engine 2 may therefore warm-up to normal operating conditions more quickly.

As depicted in FIG. 1, a portion of the coolant flowing through the engine housing 4 may be directed to flow through an ancillary component 6 of the engine assembly 2, such as an oil cooler, or a heater, such as for a climate control system of the motor vehicle, in order to cool the ancillary component 6.

As shown, the portion of the coolant may flow through the engine housing 4 and may leave the engine housing via a second outlet 4b before flowing through the ancillary component 6. The flow of coolant through the ancillary component 6 is therefore not controlled by the operation of the engine thermostat 106, such as the ancillary component 6 is substantially unaffected by the thermostat 106.

The cooling system 100 further comprises a connector 200. As depicted, the connector 200 may be provided in the bypass duct 108, such as directly downstream, from the engine thermostat 106. As depicted in FIG. 1, the connector 200 may be a T-connector.

Figure 2:
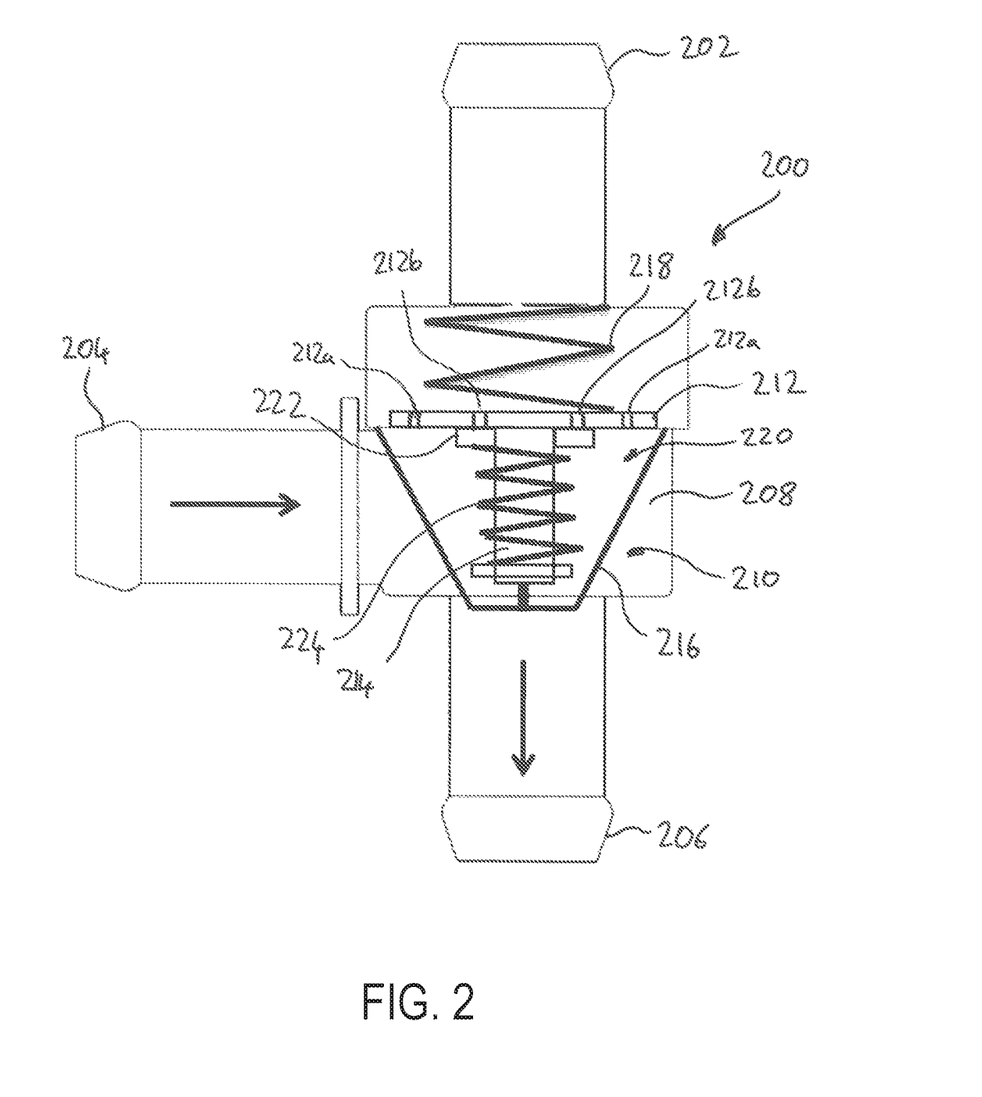
FIG. 2 is a schematic, sectional view of a connector for an engine cooling system, according to arrangements of the present disclosure, in a closed condition.

With reference to FIG. 2, the connector 200 comprises a first inlet 202, a second inlet 204, an outlet 206 and a chamber 208 in fluidic communication with the first and second inlets 202, 204 and the outlet. In other words, the chamber 208 may be provided between the first and second inlets 202, 204 and the outlet 206.

As shown in FIG. 1, the connector 200 is arranged within the cooling system 100 such that the first inlet 202 receives a flow of coolant from the engine housing 4 via the engine thermostat 106, such as the flow of coolant passing through the bypass duct 108.

The second inlet 204 of the connector 200 is arranged in fluidic communication with the ancillary component 6, such as a cooling passage outlet of the ancillary component. The coolant that has passed through the ancillary component 6 may flow into the second inlet 204 of the connector 200.

The outlet 206 of the connector is in fluidic communication with the bypass duct 108, such that coolant passing through the connector 200 from the first and second inlets 202, 204 passes into the bypass duct 108. In other words, the engine thermostat 106 and the ancillary component 6 may be connected to the bypass duct 108 by the connector 200.

Returning to FIG. 2, the connector 200 comprises a thermostatic valve 210 provided within the chamber 208. The thermostatic valve 210 is configured to selectively restrict the flow of coolant from the first inlet 202 to the outlet 206. Therefore, the coolant flow from the engine housing 4 to the bypass duct 108 is selectively restricted.

The thermostatic valve 210 may comprise a valve element 212, a temperature sensitive element 214, a support 216 and a biasing element 218.

The biasing element 218 may be configured to bias the valve element 212 into a closed position, as depicted in FIG. 2, in order to restrict the flow of coolant from the first inlet 202 to the outlet 206. Therefore, the default position of the valve restricts flow from the engine housing 4 to bypass duct 108.

As shown in FIG. 2, the thermostatic valve 210 is arranged such that fluid from the second inlet 204 passes through the chamber 208 to the outlet 206 and is in thermal communication with the thermostatic valve 210. For example, the coolant from the second inlet 204 may flow around the temperature sensitive element 214 or the support 216, which may itself be in thermal communication with the temperature sensitive element 214.

Figure 3:
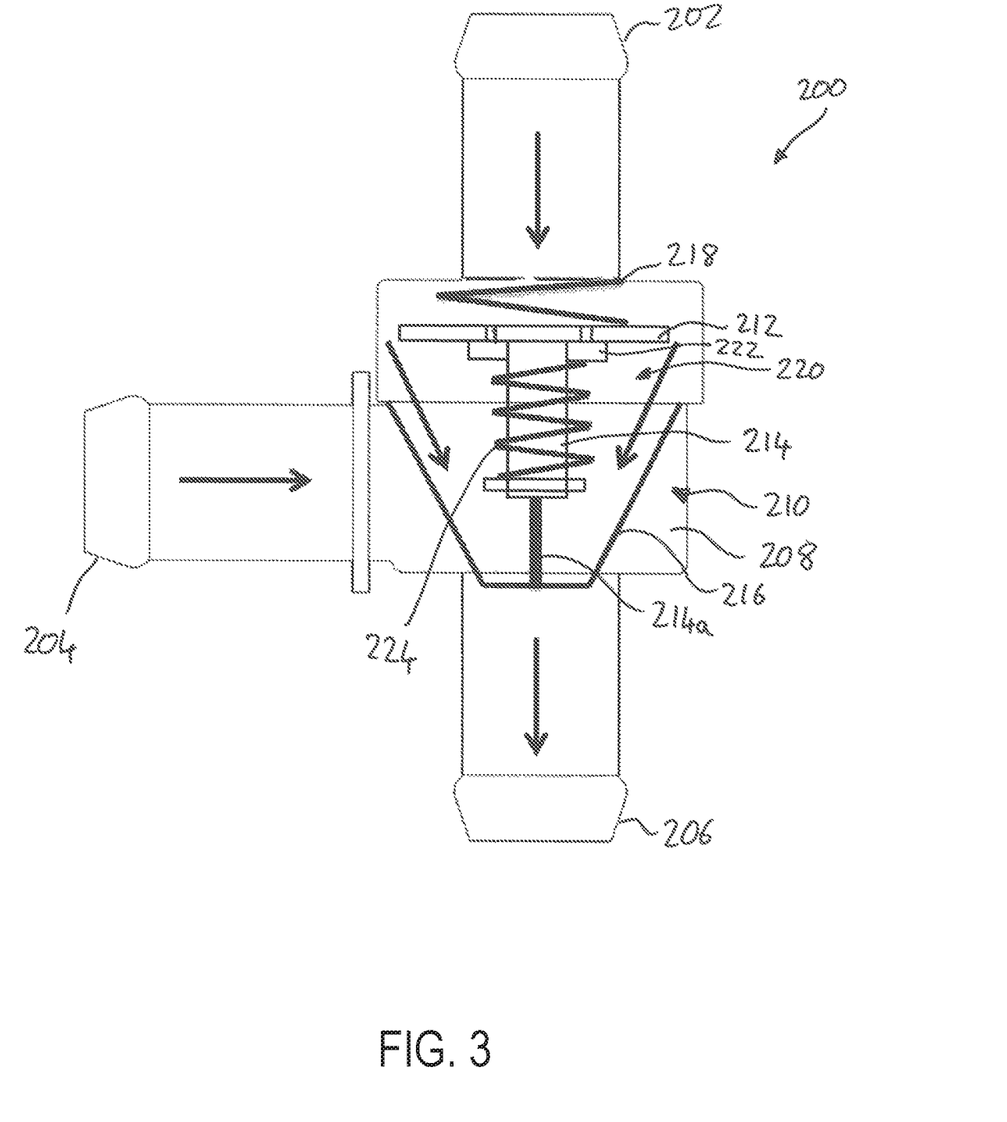
FIG. 3 is a schematic, sectional view of the connector in a first open condition.

With reference to FIGS. 2 and 3, the thermostatic valve 210 may open and close in response to the temperature of the fluid from the second inlet 206. For example, as depicted in FIG. 3, when the temperature sensitive element 214 reaches a third threshold temperature, a pin 214a may be forced out of the temperature sensitive element 214 to push on the support 216 and move the valve element 212 against the biasing element 218, so that a flow path is provided through the thermostatic valve 210, such as from the first inlet 202 to the outlet 206.

The third threshold temperature may be approximately the same as the first and/or second threshold temperatures. Unless otherwise stated, approximately is interpreted as range of plus or minus ten percent of the value. Alternatively, the third threshold temperature may be different from, such as less than, the first and/or second temperatures so that coolant is permitted by the thermostatic valve 210 to flow through the bypass duct 108 at a lower temperature than the temperature at which the engine thermostat 106 directs coolant towards the radiator 104.

By providing the thermostatic valve 210 within the connector 200 in the bypass duct 108, the flow of coolant through the engine housing 4 may be restricted when the engine thermostat 106 is controlling the flow of coolant leaving the engine to flow through the bypass duct 108. The temperature of coolant within the engine housing 4 may therefore increase more quickly than if the thermostatic valve 210 was not provided. In particular, the temperature of the coolant may increase more quickly when the temperature of the coolant is between the third and first threshold temperatures, than if the thermostatic valve 210 was not provided.

The temperature of the coolant flowing into the second inlet 204 may be representative of the temperature of the engine 2. For example, because the second inlet 204 may receive coolant that has passed through the engine housing 4, or another housing of the engine before passing through the ancillary component 6. Furthermore, as described above, the flow of coolant through the ancillary component may be substantially unaffected by the engine thermostat 106. The thermostatic valve 210 can therefore react quickly as the engine temperature changes, such as increased, to permit the flow of coolant from the first inlet 202 to the outlet 206, such as through the bypass duct 108.

It may be undesirable for the flow of coolant through the engine thermostat 106 and the bypass duct 108 to be below a threshold flow rate. The thermostatic valve 210 may therefore be configured to allow a bleed flow of coolant to flow from the first inlet 202 to the outlet 206, when the thermostatic valve 210 is closed.

In the arrangement depicted in FIG. 2, the valve element 212 comprises one or more bleed holes 212a to allow a bleed flow of coolant to pass through the valve element 212. In other arrangements, the chamber 208 and/or the thermostatic valve 210 may be configured to form a weir than allows a bleed flow of coolant from the first inlet 202 to bypass the thermostatic valve 210, such as when the thermostatic valve 210 is closed. For example, the valve element 212 may be sized to restrict the flow in a closed position but not completely prevent the flow.

The bleed flow of coolant may flow over or around the temperature sensitive element 214 and/or the support 216. Hence, the thermostatic valve 210 may open and close at least partially in response to the temperature of the bleed flow of coolant.

The connector 200 further comprises a pressure relief valve 220 provided within the chamber 208. The pressure relief valve 220 is provided within the flow path from the first inlet 202 to the outlet 206. The pressure relief valve 220 is configured to open and close in response to a pressure of the coolant at the first inlet 202 to selectively permit the coolant from the first inlet to bypass the thermostatic valve 210.

As described above, if the driver operates the engine 2 to supply a high power and/or torque during engine warm-up, a temperature of one or more components of the engine 2, such as the housing 4 or parts of the housing 4, may increase. In such circumstances it is desirable for the cooling system 100 to operate effectively to cool the engine housing 4.

Hence, when the engine 2 is operating to supply a high power and/or toque whilst the engine thermostat 106 is directing the flow of coolant into the bypass duct 108, it may be undesirable for the flow of coolant passing through the bypass duct 108 to be restricted, such as by the thermostatic valve 210.

When the engine 2 is supplying a high power and/or torque, the pressure of coolant being pumped by the coolant pump 102 may be increased, which increases the pressure of coolant leaving the engine housing 4, such as via the first and second outlets 4a, 4b.

The pressure of coolant at the first inlet 202 may increase more than the pressure of coolant at the second inlet 204, because the coolant at the second inlet 204 has passed through the ancillary component 6. The pressure difference between the coolant at the first and second inlets 202, 204 can thereby cause the pressure relief valve 220 to open, allowing coolant from the first inlet 202 to flow to the outlet 206, bypassing the thermostatic valve.

Figure 4:
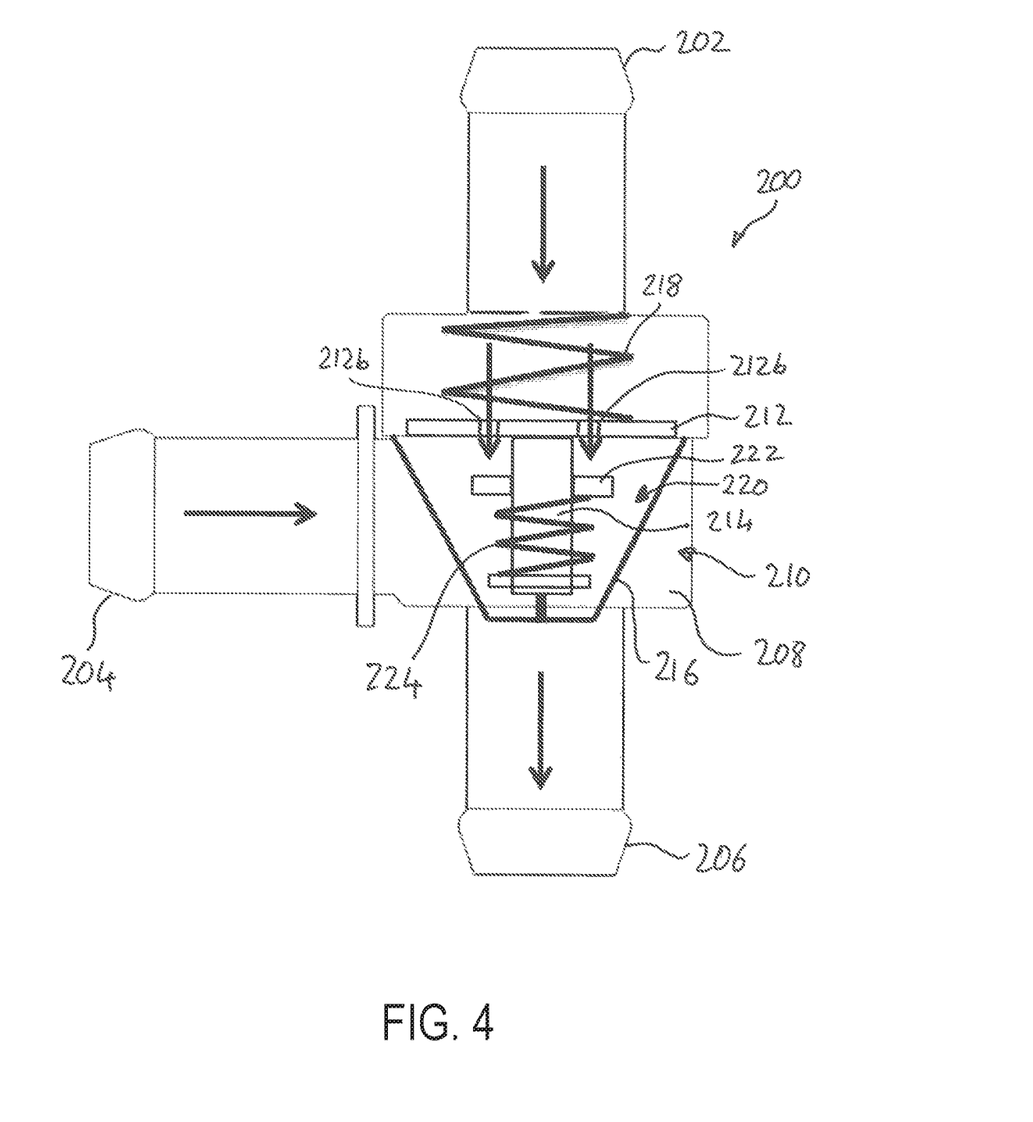
FIG. 4 is a schematic, sectional view of the connector in a second open condition.

As shown in FIGS. 2, 3 and 4, the pressure relief valve 220 may be integrated into the thermostatic valve 210. In the arrangement depicted, the valve element 212 of the thermostatic valve 210 comprises one or more pressure relief openings 212b for allowing a flow of coolant through the valve element 212 when the pressure relief valve 220 is open.

The pressure relief valve 220 comprises a further valve element 222 and a further biasing element 224. As depicted, the further valve element 222 may be movably, such as slidably, supported by the thermostatic valve, such as by the temperature sensitive element 214 of the thermostatic valve. The further biasing element 224 may be arranged about the temperature sensitive element 214. For example, the further biasing element 224 may comprise a coil spring or a resilient material arranged about the temperature sensitive element 214.

As depicted in FIGS. 2 and 3, when the pressure relief valve 220 is in a closed position, such as when a difference in pressure between the coolant at the first and second inlets 202, 204 is below a threshold value, the further biasing element 224 holds the further valve element 222 against the valve element 212 to restrict flow through the pressure relief openings 212b.

As depicted in FIG. 4, when the difference in pressure between the coolant at the first and second inlets 202, 204 is at or above the threshold value, the pressure force acting on the further valve element 222 forces the further valve element 222 against the further biasing element 224 into an open position of the pressure relief valve 220, such that, coolant is able to flow through the pressure relief openings 212b. The coolant from the first inlet 202 is therefore able to flow to the outlet 206, bypassing the thermostatic valve 210. When the pressure relief valve 220 is in the open position, the flow of coolant through the connector 200, such as through the thermostatic valve 210, may be substantially unrestricted.

In the arrangement depicted, the pressure relief valve 220 is integrated into the thermostatic valve 210. However, in other arrangements the pressure relief valve 220 may be separate from the thermostatic valve 210. For example, the pressure relief valve 220 may be provided adjacent to the thermostatic valve 210 within the chamber 208.

The difference in pressure between the coolant from the engine thermostat 106 and the ancillary component 6 may vary depending on a running speed of the engine 2. The threshold value of the pressure difference may therefore be selected such that the pressure relief valve 220 opens when the engine 2 reaches a desirable running speed to provided increased cooling for the engine at and above the desirable engine running speed, such as during engine warm-up.

Although in FIG. 3 the thermostatic valve 210 is open whilst the pressure relief valve 220 is closed, and in FIG. 4 the pressure relief valve 220 is open whilst the thermostatic valve 210 is closed, it will be appreciated that in some cases, such as under certain engine operating conditions, the thermostatic valve 210 and the pressure relief valve 220 may be at least partially open at the same time.

Embodiments of a thermostatic valve will restrict fluid flow at low temperatures and pressures causing the engine to reach an operating temperature more quickly. Such a thermostatic valve will be in a closed position during a cold start. In a closed position, a thermostatic valve equipped with bleed holes will allow a small amount of fluid flow to bypass the thermostatic valve. This restricting of the flow through the bypass passage will keep fluid in the engine housing and allow the coolant and engine to heat up more quickly. Bringing an engine to an operating temperature quickly increases fuel economy and decreases engine wear.

An embodiment of a temperature sensitive element will cause the thermostatic valve to move into an open position when a fluid reaches a threshold temperature. The open position of the thermostatic valve allows fluid to flow relatively unrestricted and allows for proper cooling of the engine.

An embodiment of the thermostatic valve may be used in a t-shaped junction. By using the valve in a t-shaped junction, a fluid flow may be able to thermally communicate with the temperature sensitive element when the thermostatic valve is in a closed position. A temperature sensitive elements behind the valve would not contact the fluid if a thermostatic valve were used in a linear passage. Bleed holes and weirs may also be used to increase fluid communication with the temperature sensitive material. Further, one inlet of the t-shaped junction may flow fluid to the temperature sensitive material whether the valve is in an open or closed position. One embodiment of the temperature sensitive element is a wax thermostat. The temperature of the fluid penetrates the wax thermostat which causes a change in position of the valve above a temperature threshold.

A thermostatic valve may also include a pressure relief valve. If a pressure of a fluid rises above a threshold pressure, then the pressure relief valve will move into an open position. Thus, fluid will be able to flow through a pressure relief channel which bypasses the thermostatic valve. The pressure relief valve allows the fluid to flow during high pressure conditions, such as when a large amount of torque is requested. The pressure relief valve prevents possible engine damage by preventing a temperature from reaching dangerous levels before fluid flow is increased. An embodiment of a pressure relief valve allows approximately fifty percent of the flow when compared to the thermostatic valve in an open position.

Also, the pressure relief valve and thermostatic valve may operate independently. Therefore, both valves may both be in an open or closed position. Similarly, one valve may be in an open position while the other is closed. The independent functioning and positions of the valves allows for many different flow configurations. As just one example, the thermostatic valve and pressure relief valve may both be in an open position which provides a maximum flow rate through the thermostatic valve.

Devices such as wax thermostats have a response time to open a valve. The t-shaped junction, bleed holes, weirs and pressure relief valves prevent possible damage to the engine due to the thermostatic valve remaining in a closed position and engine temperature rising too dangerous levels. Conventional valves address this problem by opening the valve at a low threshold. However, this approach increase the time taken for an engine to warm up. The thermostatic valve of the application allows for the fluid flow to be restricted for longer than conventional valves while also maintaining the engine at safe temperatures.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

The invention claimed is:

1. A connector for an engine cooling system, the connector comprising: a first inlet; a second inlet; an outlet; a chamber in fluidic communication with the first inlet, second inlet and the outlet; a thermostatic valve provided within the chamber, the thermostatic valve configured to selectively restrict flow from the first inlet to the outlet, wherein the thermostatic valve is arranged such that fluid from the second inlet passes through the chamber to the outlet and is in thermal communication with the thermostatic valve, such that the thermostatic valve opens or closes in response to a temperature of the fluid from the second inlet; and a pressure relief valve provided within the chamber and within a flow path from the first inlet to the outlet, the pressure relief valve opening in response to a pressure of fluid at the first inlet to bypass the thermostatic valve, wherein the pressure relief valve is integrated into the thermostatic valve, wherein the first inlet receives coolant flow from a duct downstream of an engine thermostat, the second inlet receives coolant from a duct downstream of an ancillary engine component, and the outlet outputs coolant flow to a bypass passage which bypasses a radiator.

2. The connector of claim 1, wherein the pressure relief valve is arranged to permit a flow of fluid from the first inlet through the thermostatic valve to the outlet, in order to bypass the thermostatic valve, when the pressure relief valve is open.

3. The connector of claim 1, wherein the thermostatic valve and/or the chamber form a weir to allow a bleed flow of fluid from the first inlet through the thermostatic valve to the outlet.

4. The connector of claim 1, wherein a bleed opening is provided in the thermostatic valve element to allow a bleed flow of fluid from the first inlet through the thermostatic valve.

5. The connector of claim 1, wherein the thermostatic valve comprises a valve element extending between the first inlet and the valve chamber, and
wherein the valve element comprises a valve opening, and
wherein the pressure relief valve is configured to selectively restrict flow through the valve opening.

6. The connector of claim 1, wherein the pressure relief valve is configured to open in response to a difference in pressure between the fluid at the first inlet and the fluid at the second inlet.

7. The engine cooling system of claim 1, wherein the second inlet of the connector is in fluid communication with an oil cooler of the engine cooling system.

8. A vehicle comprising the engine cooling system of claim 1, wherein the second inlet is in fluid communication with a heater.

9. An engine cooling system including a connector, the connector comprising: a first inlet; a second inlet positioned to flow coolant to an outlet side of a thermostatic valve; an outlet; a chamber in fluidic communication with the first inlet, the second inlets and the outlet; the thermostatic valve positioned between the first inlet and the chamber, the thermostatic valve movable between an open position and closed position in response to a temperature of fluid from the second inlet, the closed position of thermostatic valve restricting flow from the first inlet to the chamber outlet; a pressure relief valve integrated into the thermostatic valve, the pressure relief valve positioned to allow bypass flow from the first inlet past the thermostatic valve to the outlet, the pressure relief valve blocking the bypass flow in a closed position; wherein the first inlet is downstream from an engine thermostat, the second inlet is downstream from an ancillary vehicle component, and the outlet is upstream of a bypass passage which bypasses a radiator.

10. The engine cooling system of claim 9, wherein the thermostatic valve includes a temperature valve element positioned to block fluid flow from the first inlet to the outlet and one or more flow channels through the temperature valve element which form a bypassing flow path from the first inlet to the outlet.

11. The engine cooling system of claim 10, wherein the pressure relief valve including a pressure valve element positioned to block the bypassing flow path in a closed position.

12. The engine cooling system of claim 10, wherein the second inlet is positioned downstream of the temperature valve element.

13. The engine cooling system of claim 10, wherein the temperature valve element is positioned such that the thermostatic valve opens or closes based on a temperature of coolant from the second inlet but the temperature valve element is not positioned to block coolant flow from the second inlet to the chamber.

14. A vehicle including a connector within an engine cooling system, the connector comprising: a first inlet; a second inlet positioned to flow coolant downstream of a thermostatic valve; an outlet; a chamber connected to the first inlet, the second inlet, and the outlet; the thermostatic valve positioned between the first inlet and the chamber and movable between an open position and closed position in response to a temperature of a fluid, the thermostatic valve positioned to block fluid flow from the first inlet to the outlet in a closed position; a pressure relief valve integrated into the thermostatic valve, the pressure relief valve positioned to block fluid flow through a bypass channel from the first inlet to the outlet in a closed position and the bypass channel extending through or around the thermostatic valve, wherein the thermostatic valve includes a temperature sensitive element positioned downstream of a thermostatic valve element extending across the first inlet, and wherein fluid flow from the second inlet contacts the temperature sensitive element.

15. The vehicle of claim 14, wherein the thermostatic valve includes one or more bleed holes.

16. The vehicle of claim 14, wherein the first inlet is downstream from an engine thermostat, the second inlet is downstream from an ancillary vehicle component, and the outlet is upstream of a bypass passage which bypasses a radiator.

17. The vehicle of claim 14, wherein the thermostatic valve comprises a thermostatic valve element extending across the first inlet and a temperature sensitive element extending downstream from the thermostatic valve element to contact fluid from the second inlet.

* * * * *